(12) United States Patent
Chen et al.

(10) Patent No.: US 11,148,283 B2
(45) Date of Patent: Oct. 19, 2021

(54) SERVO AND ROBOT HAVING THE SAME

(71) Applicant: UBTECH ROBOTICS CORP LTD, Shenzhen (CN)

(72) Inventors: Jianli Chen, Shenzhen (CN); Youjun Xiong, Shenzhen (CN); Hongyu Ding, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 99 days.

(21) Appl. No.: 16/702,480

(22) Filed: Dec. 3, 2019

(65) Prior Publication Data

US 2020/0198126 A1 Jun. 25, 2020

(30) Foreign Application Priority Data

Dec. 24, 2018 (CN) .......................... 201811582219.1

(51) Int. Cl.
| | | |
|---|---|---|
| *B25J 9/12* | (2006.01) | |
| *B25J 9/10* | (2006.01) | |
| *B25J 17/02* | (2006.01) | |
| *F16H 1/20* | (2006.01) | |

(52) U.S. Cl.
CPC ............... *B25J 9/126* (2013.01); *B25J 9/102* (2013.01); *B25J 17/0258* (2013.01); *F16H 1/20* (2013.01)

(58) Field of Classification Search
CPC ........ B25J 9/126; B25J 9/102; B25J 17/0258; F16H 1/20
See application file for complete search history.

(56) References Cited

U.S. PATENT DOCUMENTS

| | | | | |
|---|---|---|---|---|
| 3,396,594 | A * | 8/1968 | Walker ................... | F16H 57/12 74/409 |
| 4,147,071 | A * | 4/1979 | Scribner .................. | F16H 1/20 409/146 |
| 4,165,658 | A * | 8/1979 | Ueno ....................... | F16H 1/20 251/248 |
| 6,076,415 | A * | 6/2000 | Trafton .................... | F16H 3/34 74/337.5 |
| 6,485,394 | B1 * | 11/2002 | Minegishi ................ | F16H 1/20 475/269 |
| 2017/0277116 | A1 * | 9/2017 | Itabashi .................. | F16H 25/16 |
| 2018/0347682 | A1 * | 12/2018 | Masuzawa .......... | F16H 57/0493 |
| 2019/0097491 | A1 * | 3/2019 | Xiong .................... | H02K 11/30 |
| 2019/0097496 | A1 * | 3/2019 | Xiong .................. | H02K 11/215 |

(Continued)

FOREIGN PATENT DOCUMENTS

CN 207548788 U 6/2018

*Primary Examiner* — Zakaria Elahmadi

(57) ABSTRACT

A servo includes a housing, and a motor, a reduction gear drive mechanism, an output shaft, a position sensor and at least two stages of transmission gear. The reduction gear drive mechanism is connected with motor and the output shaft of the servo, the reduction gear drive mechanism used to transmit power from the motor to the output shaft of the servo. A head stage of the transmission gear is located on a tail end of the output shaft of the servo, and the position sensor is located at an axis of a tail stage of the transmission gear. The at least two stages of transmission gear transmit a rotation angle of the output shaft of the servo to the position sensor by a ratio of 1:1, the position sensor is not arranged coaxially with the output shaft of the servo.

16 Claims, 5 Drawing Sheets

(56) References Cited

U.S. PATENT DOCUMENTS

| | | | |
|---|---|---|---|
| 2019/0181719 A1* | 6/2019 | Xiong | B25J 9/126 |
| 2019/0257402 A1* | 8/2019 | Kannan | F16C 3/02 |
| 2020/0223417 A1* | 7/2020 | Otto | F16D 65/16 |
| 2020/0233448 A1* | 7/2020 | Chen | H02K 7/116 |
| 2020/0254634 A1* | 8/2020 | Awad | B25J 19/068 |
| 2020/0278010 A1* | 9/2020 | Larson | F16H 1/2863 |
| 2020/0283242 A1* | 9/2020 | Osaka | B65G 47/905 |
| 2020/0309197 A1* | 10/2020 | Kitanaka | F16D 7/024 |
| 2020/0378482 A1* | 12/2020 | Blesener | H02K 11/35 |
| 2020/0386340 A1* | 12/2020 | Lv | F16K 27/048 |
| 2021/0071731 A1* | 3/2021 | Hung | A63B 21/0052 |

* cited by examiner

SERVO AND ROBOT HAVING THE SAME

CROSS REFERENCE TO RELATED APPLICATIONS

This application claims priority to Chinese Patent Application No. 201811582219.1, filed Dec. 24, 2018, which is hereby incorporated by reference herein as if set forth in its entirety.

BACKGROUND

1. Technical Field

The present disclosure generally relates to servos, and particularly to a servo with a position sensor arranged not coaxially with an output shaft of the servo and a robot having the servo.

2. Description of Related Art

A servo is a core component of power output of a robot. The servo generally includes a housing, a motor, a reduction gear drive mechanism, a position sensor, an output shaft and other parts. At present, the position sensor is generally arranged coaxially with the output shaft of the servo in the housing, so that the position sensor directly receives a rotation signal from the output shaft to identify an output angle signal of the output shaft of the servo. However, when there is a requirement for a cross section size of the servo as small as possible, the servo with the position sensor arranged coaxially with the output shaft has low space utilization rate, and there is a possibility of interference between the motor and the sensor position, which becomes a bottleneck of reducing the size of the servo.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
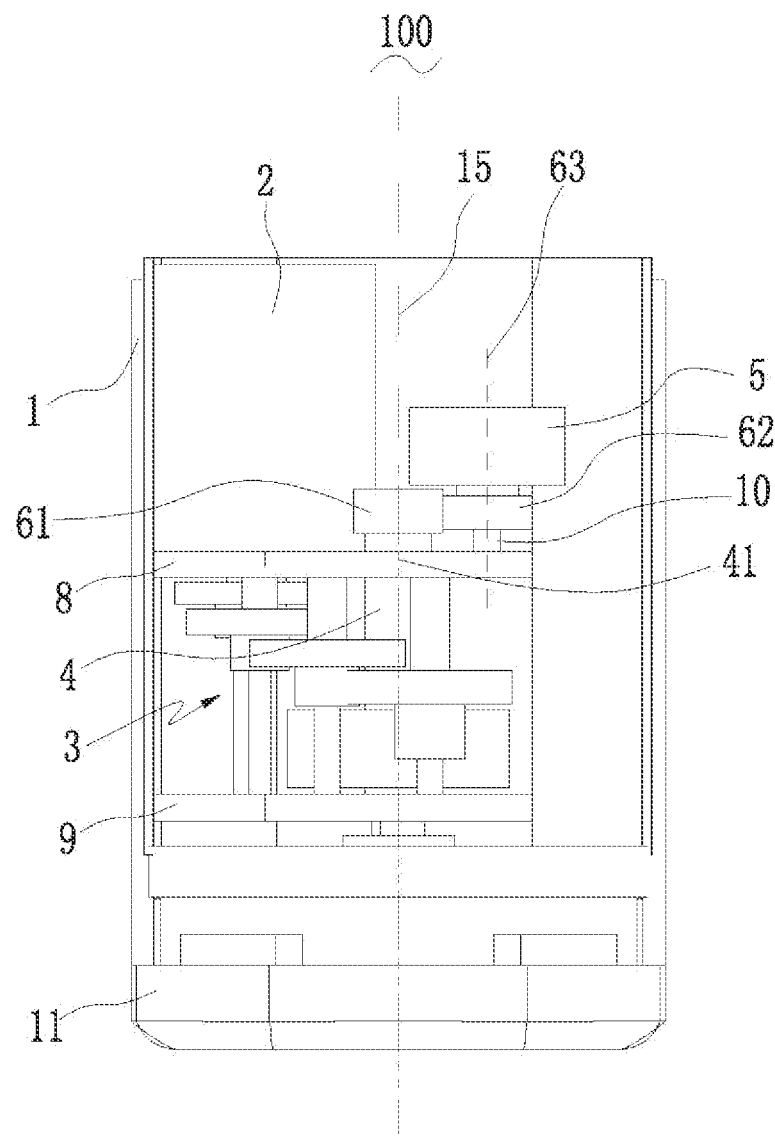
FIG. 1 is an internal structure view of a servo according to an exemplary embodiment of the present disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
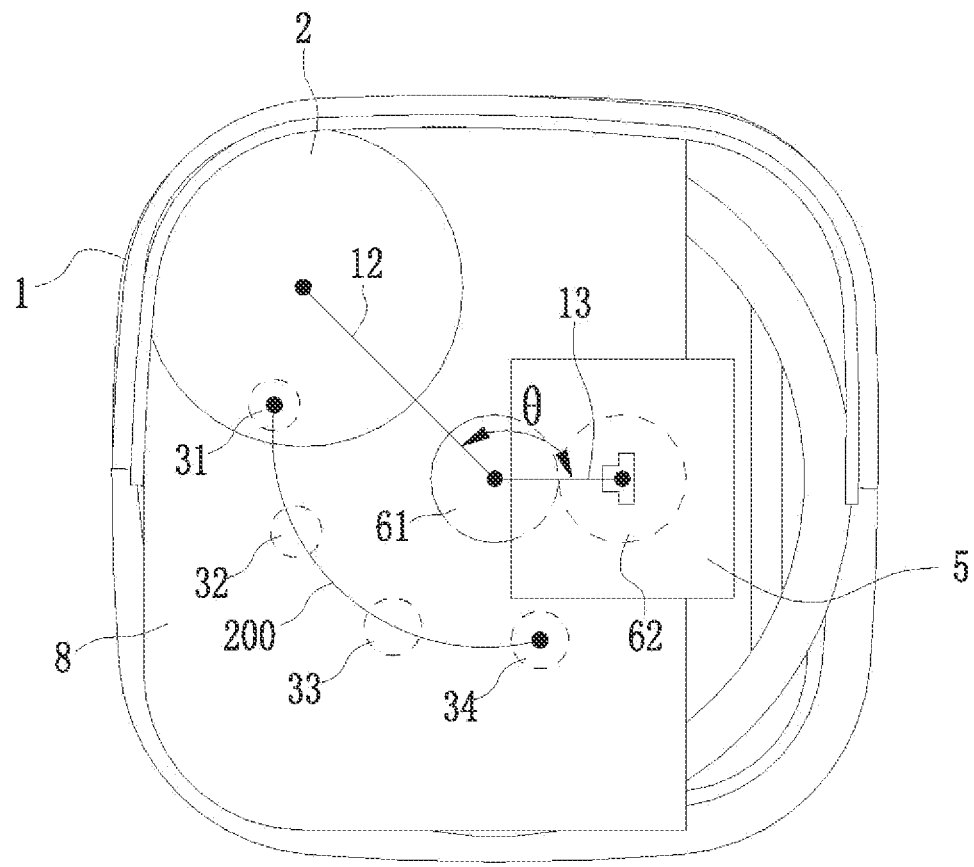
FIG. 2 is a top view of a part of the servo of FIG. 1.
Figure 3:
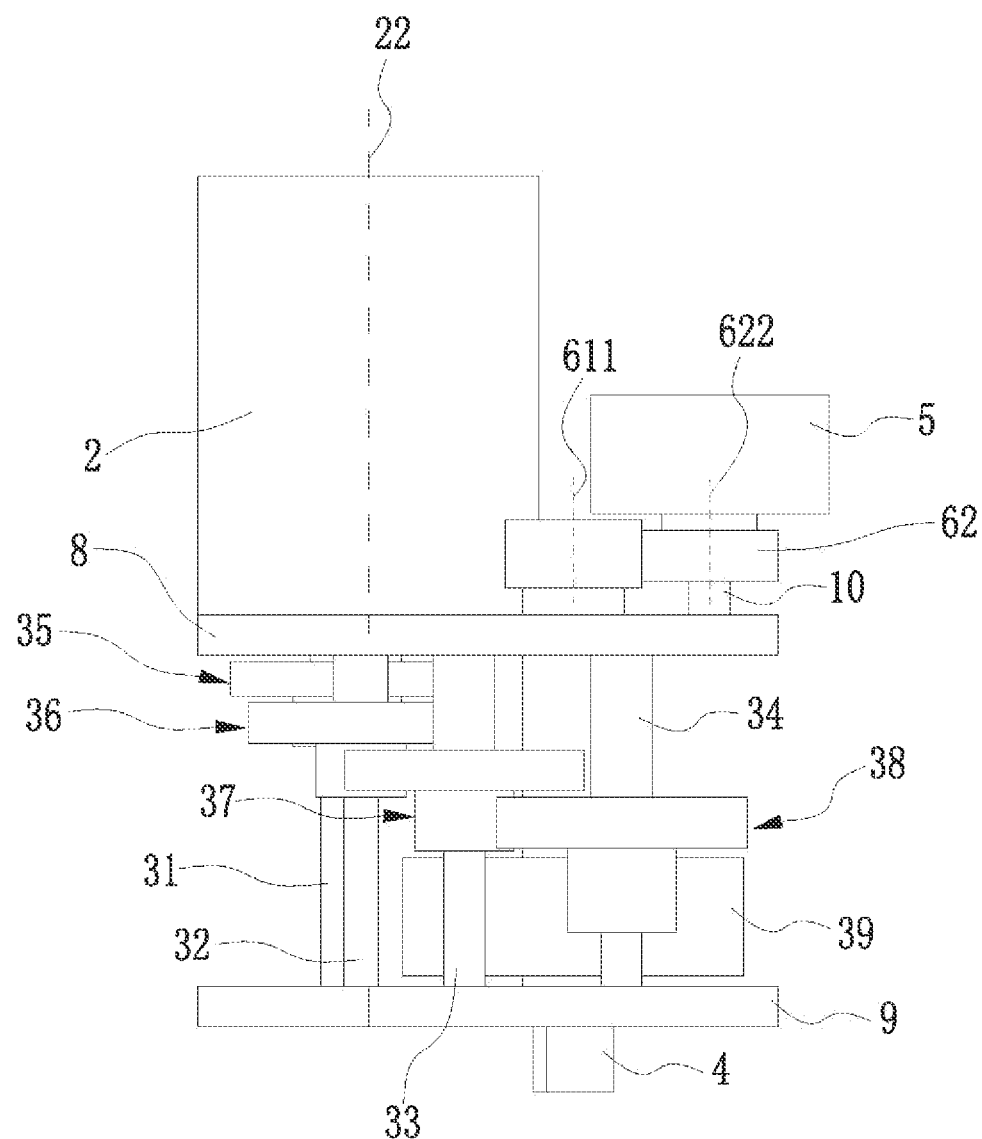
FIG. 3 is a front view of the part of the servo of FIG. 2.

Referring to FIGS. 1 to 3, in one embodiment of the present disclosure, a servo 100 includes a housing 1, a motor 2, a reduction gear drive mechanism 3, an output shaft 4, a position sensor 5, at least two stages of transmission gear 6 and a servo plate 11. The housing 1 is hollow inside and substantial in a shape of a cylinder. The motor 2, the reduction gear drive mechanism 3, the output shaft 4, the position sensor 5, the at least two stages of transmission gear 6 and the servo plate 11 are all received in the housing 1. In the embodiments, the servo plate 11 is in a shape of a disk. Alternatively, the servo plate 11 may also be in other shapes, such as in a square shape. The servo plate 11 is located at one end of the housing 1 far away from the motor 2. A head end of the reduction gear drive mechanism 3 is connected with an output shaft 21 of the motor 2, a tail end of the reduction gear drive mechanism 3 is connected with the output shaft 4 of the servo 100. The reduction gear drive mechanism 3 is configured to transmit power from the motor 2 to the output shaft 4 of the servo 100. An axis 41 of the output shaft 4 of the servo 100 is coincident with an axis 11 of the housing 1, the output shaft 4 of the servo 100 is connected with the servo plate 11. That is, the output shaft 4 of the servo 100 is located at the center axis 11 of the housing 1 and coaxial with the housing 1. The servo plate 11 is driven by the output shaft 4 of the servo 100. A head stage of the transmission gear 6 is arranged on a tail end of the output shaft 4 of the servo 100 and rotates with the output shaft 4 of the servo 100 synchronously, and the position sensor 5 is located at an axis 63 of a tail stage of the transmission gear 6.

In the embodiment, the at least two stages of transmission gear 6 are received in the housing 1, and each two adjacent stage of stages of transmission war 6 are engaged with each other, and a number of teeth of one stage of transmission gear 6 is equal to a number of teeth of another one stage of transmission gear 6. The head stage of the transmission gear 6 is located on the tail end of the output shall 4 of the servo 100, and the position sensor 5 is located at the axis 63 of the tail stage of the transmission gear 6, such that the at least two stages of transmission gear 6 transmit a rotation angle of the output shaft 4 of the servo 100 to the position sensor 5 by a ratio 1:1. The position sensor 5 identifies a rotation angle of the tail stage of the transmission gear 6, and the rotation angle of the tail stage of the transmission gear 6 is the same as the rotation angle of the output shaft 4 of the servo 100. That is, the output shaft 4 of the servo 100 is coaxially with the housing 1 of the servo 100, but the position sensor 5 of the embodiment of the present disclosure is not arranged coaxially with the output shaft 4 of the servo 100, and deviates from the axis 41 of the output shaft 4 of the servo 100 which prevents the interference between the position sensor 5 and the motor 2, and is conducive to use of the internal space of the servo 100 more efficient.

In one embodiment, the at least two stages of transmission gear 6 includes a first transmission gear 61 and a second transmission gear 62. The first transmission gear 61 engages with the second transmission gear 62, and a number of teeth of the first transmission gear 61 is equal to a number of teeth of the second transmission gear 62. The first transmission gear 61 is located on the tail end of the output shaft 4 and rotates with the output shaft 4 of the servo 100, the position sensor 5 is located coaxially with the second transmission gear 62. So that the first transmission gear 61 engages with the second transmission gear 62 to transmit the rotation angle of the output shaft 4 of the servo 100 by the ratio of 1:1. Alternatively, the number of stages of transmission gear 6 may also be arranged according to the layout of the internal space of the servo 100, such as three stages or more stages.

Referring to FIGS. 2 to 3, in one embodiment, on a two-dimensional plane, a center axis 622 of the second transmission gear 62 is spaced from a center axis 22 of the motor 2, relative to a center axis 611 of the first transmission gear 61, by more than 90 degrees. In other words, a first line 12 is supposed to be connected vertically between the center axis 611 of the first transmission gear 61 and the center axis 22 of the motor 2, and a second line 13 is supposes to be connected vertically between the center axis 611 of the first transmission gear 61 and the center axis 622 of the second transmission gear 62. The inclined angle θ between the first line 12 and the second line 13 is area ter than 90 degrees, which prevents the interference between the position sensor 5 and the motor 1.

Figure 5:
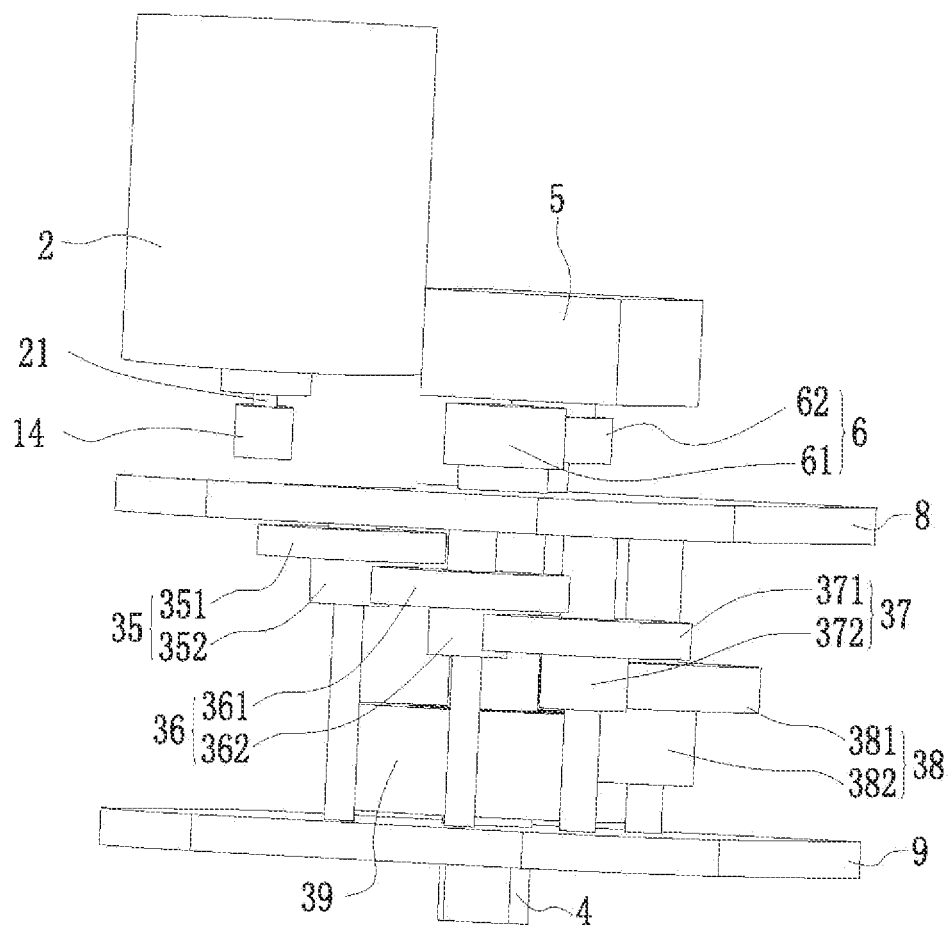
FIG. 5 is an exploded view of the part of the servo of FIG. 2.

Referring to FIG. 5, in one embodiment, the servo 100 includes a first fixed plate 8 and a second fixed plate 9. The first fixed plate 8 and the second fixed plate 9 are all received in the housing 1 and parallel with each other. The motor 2 is located on the first fixed plate 8, and the output shall 21 of the motor 2 passes through the first fixed plate 8 and extends toward the second fixed plate 9. The two ends of the output shaft 4 of the servo 100 passes through the first fixed plate 8 and the second fixed plate 9, respectively. The first transmission gear 61 is connected to the one end of the output shaft 4 close to the first fixed plate 8. The servo plate 11 is connected to the other end of the output shaft 4 of the servo 100 close to the second fixed plate 9. The reduction gear drive mechanism 3 is located between the first fixed plate 8 and the second fixed plate 9. In detail, the motor 2 can be fastened to the first fixed plate 8 via screws.

In one embodiment, in order to facilitate the installation of the second transmission gear 62, the servo 100 further includes a transmission shaft 10, one end of the transmission shaft 10 is connected with the first fixed plate 8 and the other end of the transmission shaft 10 extends upward far away from the first fixed plate 8. The transmission shaft 10 is parallel with the output shaft 4 of the servo 100, and the second transmission gear 62 is locked on the other end, of the transmission shaft 10 far away from the first fixed plate 8, and is rotatable around to the transmission shaft 10.

Figure 4:
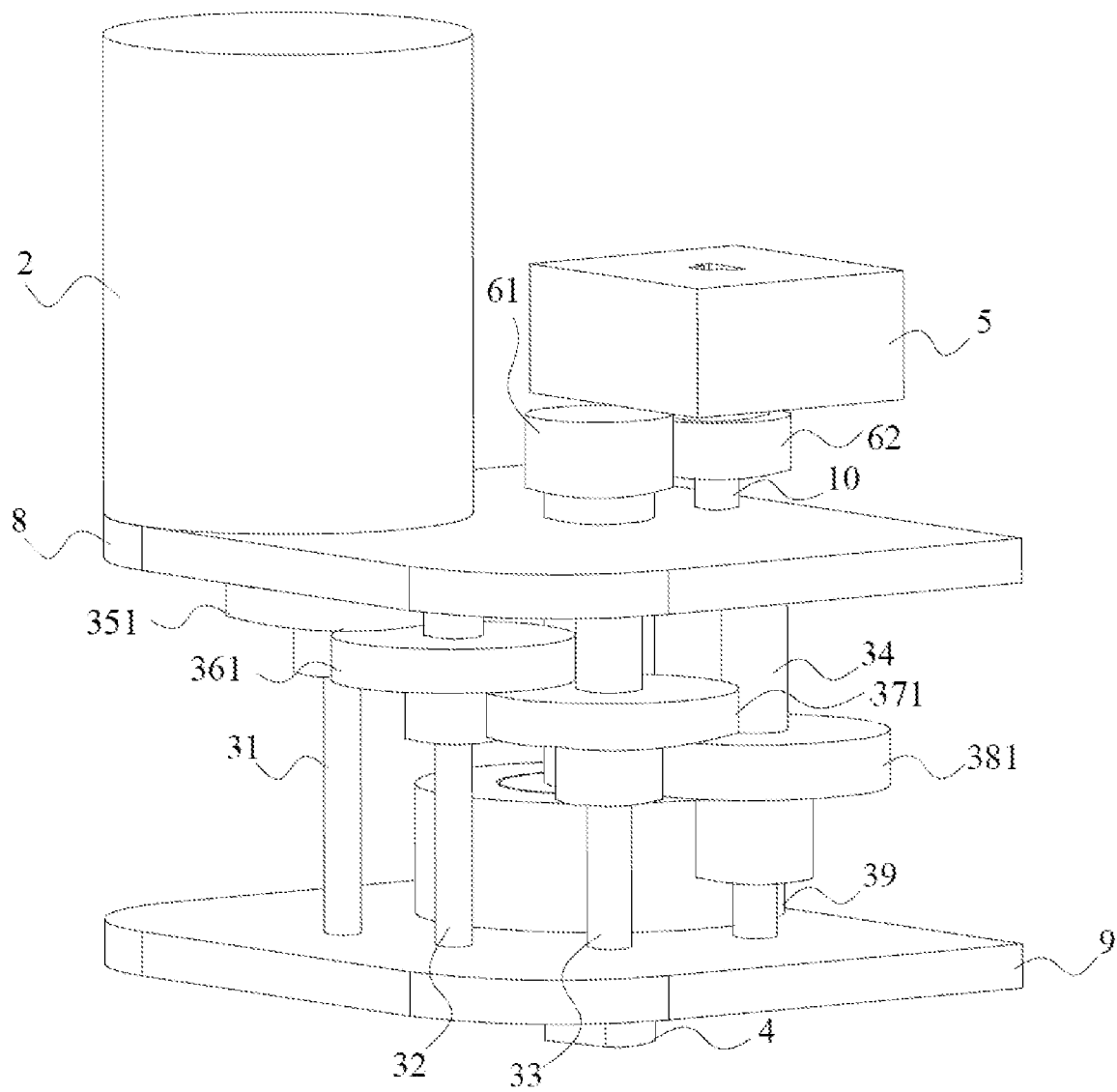
FIG. 4 is a perspective view of the part of the servo of FIG. 2.

Referring to FIGS. 3 to 5, in one embodiment, the reduction gear drive mechanism 3 includes a first stage of gear shaft 31, a second stage of gear shaft 32, a third stage of gear shaft 33, a fourth stage of gear shaft 34, a first stage of gear set 35, a second stage of gear set 36, a third stage of gear set 37, a fourth stage of gear set 38, a motor gear 14 and a fifth gear 39. The first stage of gear shaft 31, the second stage of gear shaft 32, the third stage of gear shaft 33 and the fourth stage of gear shaft 34 are arranged in parallel with the output shaft 4 of the servo 100. The two ends of each of the first stage of gear shaft 31, the second stage of gear shaft 32, the third stage of gear shaft 33 and the fourth stage of gear shaft 34 are connected with the first fixed plate 8 and the second fixed plate 9, respectively. The first stage of gear set 35 is connected with the first stage of gear shaft 31. The second stage of gear set 36 is connected with the second stage of gear shaft 32. The third stage of gear set 37 is connected with the third stage of gear shaft 33. The fourth stage of gear set 38 is connected with the fourth stage of gear shaft 34. The motor gear 14 is connected with the output shaft 21 of the motor 2. The fifth gear 39 is connected with the output shaft 4 of the servo 100. The motor gear 14, the first stage of gear set 35, the second stage of gear set 36, the third stage of gear set 37, the fourth stage of gear set 38 and the fifth gear 39 engage with each other orderly to transmit the power of the motor 2 to the output shaft 4 of the servo 100. In other embodiments, a number of stages of the gear shaft and a number of stages of the gear set can be set according to actual speed reduction requirements.

In one embodiment, the first stage of gear shaft 31, the second stage of gear shaft 32, the third stage of gear shaft 33 and the fourth stage of gear shaft 34 are arranged around the output shaft 4 of the servo 100, a connecting lines 200 of the center points of the first stage of gear shaft 31, the second stage of gear shaft 32, the third stage of gear shaft 33 and the fourth stage of gear shaft 34 are in arc-shaped, which results a more compact space of the whole structure of the servo 100 and full use of the internal space of the servo 100.

In one embodiment, the first stage of gear set 35, the second stage of gear set 36, the third stage of gear set 37 and the fourth stage of gear set 38 are located in ladder-shaped. In other words, heights of the first stage of gear set 35, the second stage of gear set 36, the third stage of gear set 37 and the fourth stage of gear set 38 gradually decrease, the first stage of gear set 35 is located near the first fixed plate 8, and the fourth stage of gear set 38 is located near the second fixed plate 9, which results a more compact space of the whole structure of the servo 100 and full use of the internal space of the servo 100.

In one embodiment, each of the first stage of gear set 35, the second stage of gear set 36, the third stage of gear set 37 and the fourth stage of gear set 38 includes a big gear and a small gear, the big gear and the small gear are fixedly connected together and rotate coaxially. In order to simplify the structure and save the cost, the big gear and the small gear are formed integrated together. The big gear 351 of the first stage of gear set 35 engages with the motor gear 14, the small gear 352 of the first stage of gear set 35 engages with the big gear 361 of the second stage of gear set 36, the small gear 362 of the second stage of gear set 36 engages with the big gear 371 of the third stage of gear set 37, the small gear 372 of the third stage of gear set 37 engages with the big gear 381 of the fourth stage of gear set 38, the small gear 382 of the fourth stage of gear set 38 engages with the fifth gear 39. The big gear 351 of the first stage of gear set 35 is located upon the small gear 352 of the first stage of gear set 35, the big gear 361 of the second stage of gear set 36 is located upon the small gear 362 of the second stage of gear set 36, the big gear 371 of the third stage of gear set 37 is located upon the small gear 372 of the third stage of gear set 37, the big gear 381 of the fourth stage of gear set 38 is located upon the small gear 382 of the fourth stage of gear set 38.

A robot according to one embodiment of the present disclosure includes the servo 100 as described above.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo comprising:
    a housing;
    a motor received in the housing;
    a reduction gear drive mechanism received in the housing, wherein a head end of the reduction gear drive mechanism is connected with an output shaft of the motor;
    an output shaft received in the housing, wherein an axis of the output shaft of the servo is coincident with an axis of the housing and the output shaft of the servo is connected with a tail end of the reduction gear drive mechanism;
    a position sensor received in the housing;
    a servo plate located at one end of the housing far away from the motor, the servo plate is connected with a head end of the output shall of the servo and is driven by the output shaft of the servo; and at least two stages of transmission gear received in the housing, wherein each two adjacent stages of transmission gear are engaged with each other, and a number of teeth of ono stage of transmission gear is equal to a number of teeth of another one stage of transmission gear, and wherein a head stage of the transmission gear is fixed and sleeved on a tail end of the output shaft of the servo, and the position sensor is located at an axis of a tail stage of the transmission gear;

wherein the reduction gear drive mechanism is engaged with the output shaft of the servo at a position located between the servo plate and the head stage of the transmission gear.

2. The servo of claim 1, wherein the at least two stages of transmission gear comprises a first transmission gear and a second transmission gear engaged with the first transmission gear, and a number of teeth of the first transmission gear is equal to a number of teeth of the second transmission gear, the first transmission gear is located on the tail end of the output shalt of the servo, the position sensor is located at coaxially with the second transmission gear.

3. The servo of claim 2, wherein on a two-dimensional plane, a center axis of the second transmission gear is spaced from a center axis of the motor, relative to a center axis of the first transmission gear, by more than 90 degrees.

4. The servo of claim 2, further comprising a first fixed plate and a second fixed plate, wherein the first fixed plate and the second fixed plate are received in the housing and parallel with each other, the motor is located on the first fixed plate, the two ends of the output shaft of the servo pass through the first fixed plate and the second fixed plate, respectively, and the reduction gear drive mechanism is located between the first fixed plate and the second fixed plate.

5. The servo of claim 4, further comprising a transmission shaft, wherein one end of the transmission shaft is connected with the first fixed plate, the transmission shaft is parallel with the output shaft of the servo, the second transmission gear is locked on the other end of the transmission shaft far away from the first fixed plate.

6. The servo of claim 2, wherein the reduction gear drive mechanism comprises:

a first stage of gear shaft parallel with the output shaft of the servo, the two ends of the first stage of gear shall are connected with the first fixed plate and the second fixed plate, respectively;

a second stage of gear shaft parallel with the output shaft of the servo, the two ends of the second stage of gear shaft are connected with the first fixed plate and the second fixed plate, respectively;

a third stage of gear shaft parallel with the output shaft of the servo, the two ends of the third stage of gear shaft are connected with the first fixed plate and the second fixed plate, respectively;

a fourth stage of gear shall parallel with the output shaft of the servo, the two ends of the fourth stage of gear shaft are connected with the first fixed plate and the second fixed plate, respectively;

a first stage of gear set is connected with the first stage of gear shall;

a second stage of gear set is connected with the second stage of gear shaft;

a third stage of gear set is connected with the third stage of gear shaft;

a fourth stage of gear set is connected with the fourth stage of gear shaft;

a motor gear is connected with the output shaft of the motor; and a fifth gear is connected with the output shaft of the servo;

wherein the motor gear, the first stage of gear set, the second stage of gear set, the third stage of gear set, the fourth stage of gear set engage with the fifth gear on the output shaft of the servo in turn.

7. The servo of claim 6, wherein the first stage of gear shaft, the second stage of gear shaft, the third stage of gear shaft and the fourth stage of gear shaft are located around the output shaft of the servo in an arc-shaped.

8. The servo of claim 6, wherein the first stage of gear set, the second stage of gear set, the third stage of gear set and the fourth stage of gear set are located in ladder-shaped.

9. The servo of claim 6, wherein each of the first stage of gear set, the second stage of gear set, the third stage of gear set and the fourth stage of gear set comprises a big gear and a small gear under the big gear, the big gear of the first stage of gear set engages with the motor gear, the small gear of the first stage of gear set engages with the big gear of the second stage of gear set, the small gear of the second stage of gear set engages with the big gear of the third stage of gear set, the small gear of the third stage of gear set engages with the big gear of the fourth stage of gear set, the small gear of the fourth stage of wear set engages with the fifth gear.

10. A robot con rising a servo, the servo comprising:

a housing;

a motor received in the housing;

a reduction gear drive mechanism receive in the housing, wherein a head end the reduction gear drive mechanism is connected with an output shaft of the motor;

an output shalt received m the housing, wherein an axis of the output shaft of the servo is coincident with an axis of the housing and the output shaft of the servo is connected with a tail end of the reduction gear drive mechanism;

a position sensor received in the housing;

a servo plate located at one end of the housing far away from the motor, the servo plate is connected with a head end of the output shaft of the servo and is driven by the output shaft of the servo; and at least two stages of transmission gear received in the housing, wherein each two adjacent stages of transmission gear are engaged with each other, and a number of teeth of one stage of transmission gear is equal to a number of teeth of another one stage of transmission gear, and wherein a head stage of the transmission gear is fixed and sleeved on a tail end of the output shaft of the servo, and the position sensor is located at an axis of a tail stage of the transmission gear;

wherein the reduction near drive mechanism is engaged with the output shaft of the servo at a position located between the servo plate and the head stage of the transmission gear.

11. The servo of claim 1, wherein the reduction gear drive mechanism includes an output gear, wherein the output gear is fixed and sleeved on the output shaft of the servo and disposed between the servo plate and the head stage of the transmission gear.

12. The servo of claim 11, wherein the reduction gear drive mechanism further includes a motor gear and at least one stage of gear set, wherein the motor gear is fixed and sleeved on the output shaft of the motor, and the at least one stage of gear set is engaged with the motor gear and the output gear.

13. The servo of claim 1, further comprising a first fixed plate received in the housing, wherein the tail end of the output shall of the servo passes through the first fixed plate to connect the head stage of the transmission gear, and the first fixed plate separates the reduction gear drive mechanism from the at least two stages of transmission gear.

14. The servo of claim 13, wherein both the motor and the position sensor are mounted to a surface of the first fixed plate facing away from the reduction gear drive mechanism, and are disposed non-coaxially with output shaft of the servo.

15. The servo of claim 14, wherein, on the surface of the first fixed plate, a first line connects a projection of a center axis of the motor and a projection of a center axis of the head stage of the transmission gear, a second line connects a projection of a center axis of the tail stage of the transmission gear and the projection of the center axis of the head stage of the transmission gear, the first line and the second line intersect at an angle of more than 90 degrees.

16. The servo of claim 13, further comprising a second fixed plate received in the housing, wherein the head end of the output shaft of the servo passes through the second fixed plate to connect the servo plate, and the second fixed plate separates the reduction gear drive mechanism from the servo plate.

* * * * *